United States Patent [19]

Murakami

[11] Patent Number: 5,200,691

[45] Date of Patent: Apr. 6, 1993

[54] CONTROL SYSTEM FOR EXCITATION OF SYNCHRONOUS MACHINE

[75] Inventor: Hitoshi Murakami, Sayama, Japan

[73] Assignee: Kabushiki Kasiha Toshiba, Kawasaki, Japan

[21] Appl. No.: 670,869

[22] Filed: Mar. 18, 1991

[30] Foreign Application Priority Data

Mar. 16, 1990 [JP] Japan .................................. 2-64123

[51] Int. Cl.$^5$ .............................................. H02P 9/00
[52] U.S. Cl. ........................................ 320/25; 320/28
[58] Field of Search ...................... 322/22, 23, 24, 25, 322/28; 318/801, 803, 809, 811

[56] References Cited

U.S. PATENT DOCUMENTS

| | | | |
|---|---|---|---|
| 3,634,750 | 1/1972 | Bobo .................... | 322/28 X |
| 4,264,856 | 4/1981 | Frierdich et al. ...... | 322/25 |
| 4,472,806 | 9/1984 | Blair ................... | 371/68 |
| 4,641,079 | 2/1987 | Kato et al. ............ | 322/28 X |

FOREIGN PATENT DOCUMENTS 49-79158 7/1974 Japan .
2-219466 9/1990 Japan .

OTHER PUBLICATIONS

Patent Abstracts of Japan, vol. 14, No. 120, Mar. 1990 (Pub No. JP-A-1 315 300).

Primary Examiner—Steven L. Stephan
Assistant Examiner—Kristine Peckman
Attorney, Agent, or Firm—Foley & Lardner

[57] ABSTRACT

An excitation control apparatus for a synchronous machine comprises a plural number of group control units that perform control of output pulses of a plural number of phase components, respectively, with each of the group control units including an automatic voltage regulator portion that outputs a control signal to regulate the terminal voltage of a synchronous machine, a phase control portion that outputs a phase signal to control the phase of a trigger pulse of a thyristor rectifier that supplies a field current to a field winding of the synchronous machine, an intermediate phase selector portion that selects a phase signal of an intermediate phase from phase signals that are supplied from the phase control portions of the group control units, and a pulse output portion that outputs the trigger pulse on the basis of the intermediate phase signal selected by the intermediate phase selector portion, a logical calculation circuit that supplies to the thyristor rectifier the logical sum of the trigger pulses from the group control units.

8 Claims, 5 Drawing Sheets

| DA | DB | DC | PHA | PHB | PHC | PLA |
|---|---|---|---|---|---|---|
| L | L | L | PA | PB | PC | MAJORITY RESULT OF PA, PB AND PC |
| H | L | L | H | PB | PC | LOGICAL SUM OF PB AND PC |
| L | H | L | PA | H | PC | LOGICAL SUM OF PC AND PA |
| L | L | H | PA | PB | H | LOGICAL SUM OF PA AND PB |
| H | H | L | H | L | PC | PC |
| H | L | H | L | PB | H | PB |
| L | H | H | PA | H | L | PA |
| H | H | H | L | L | L | L |

CONTROL SYSTEM FOR EXCITATION OF SYNCHRONOUS MACHINE

BACKGROUND OF THE INVENTION

The present invention relates to an excitation control system provided to a synchronous machine such as a synchronous generator or a synchronous electric motor or the like, and more particularly, to an excitation control system for synchronous machines that are duplicated so as to increase the reliability.

In general, excitation control systems for synchronous machines have a basic function to perform automatic voltage regulation functions so as to control a terminal voltage of the synchronous machines to be constant, with ancillary functions being an overexcitation limit function and an underexcitation limit function so that the operation of the synchronous machine is stable and within the critical limits. Furthermore, there is also a control system provided with many complex functions such as secondary regulation functions so that the performance and the ineffective power are stable.

However, when there is the generation of a failure in such an excitation control system, a control abnormality generates and the control operation stops so that it is no longer possible to continue the operation of the synchronous machine. Accordingly, it is required that there be a high reliability of excitation control systems. In particular, in cases when there is a largecapacity synchronous generator provided to operating power facilities, it is necessary that there always be an extremely high reliability from the point of view of the public nature and the social importance of power supply.

Control systems for which such extremely high reliability is demanded are generally such that there is duplicated configuration of control systems so that the reliability of the control system itself is increased so as to prevent the generation of failures and so that it is possible to continue the operation of the machines that are the object of control even if a failure should generate.

Conventionally, phase control apparatus that generates thyristor arc pulses in synchronization with a phase angle of a voltage of an AC power are used in order to control an output voltage of a thyristor rectifier. When a high reliability is required of the phase control apparatus, one of the two control system is used as the regular system and the other is used as a standby system, with the regular system being normally used, and the standby system being used when there is a failure in the regular system.

In the phase control apparatus, the regular system and the standby system both have a phase detector that detects the phase angle of six phase components, a comparator that compares the output of said phase detectors and the phase control commands from a controller and outputs the pulse output conditions, and a pulse width limiter that outputs a pulse signal that is limited to a predetermined width when the pulse output conditions have become an arbitrary level out of two signal levels. Furthermore the control apparatus is provided with a switch to switch between the regular system and the standby system, and a failure detector to switch this switch when there is an abnormality in the pulse signals that are output from the regular system.

However, in the conventional phase control apparatus, there is a time delay from the detection of the abnormality in the regular system by the failure detector and the output of the switching signal, until the time that the switch actually switched from the regular system to the standby system and during this time, it is not possible to control the thyristor rectifier that there is the problem of the generation of swing in the DC component that is output from the thyristor.

In addition, when the six-component pulse signal output from the pulse limiter has stopped for some reason, it is still possible for the failure detector to detect the signal stop but detection is not possible when there is an abnormality in the pulse output condition signal or the six-component phase angle signal output from the comparator and the phase detector, and there is the problem that it is not possible to prevent control abnormalities in the thyristor rectifier.

SUMMARY OF THE INVENTION

An object of the present invention is to provide a phase control apparatus that has a high reliability and that enables the supply of correct pulse signals to a thyristor rectifier even if there is a failure in the phase control apparatus.

The present invention has as another object the provision of an excitation control system that has an extremely high reliability and that can continue normal operation even if two of the triplicated control systems fail.

In order to achieve the primary object, an excitation control apparatus relating to the present invention comprises a plural number of group control units that perform control of output pulses of a plural number of phase components, respectively, with each of the group control units being configured from automatic voltage regulator portions that output control signals so as to regulate a terminal voltage of a synchronous machine, phase control portions that output phase, signals so as to control the phase of a trigger pulse or a firing pulse of a thyristor rectifier apparatus that supplies a field current to a field winding of the synchronous machine, an intermediate phase selector portion that selects phase signals of an intermediate phase from amongst a plural number of phase signals that are input from the phase control portions of each of the group control units, and a pulse output portion that outputs the trigger pulse on the basis of the intermediate phase signals selected by the intermediate phase selector portion, and that supplies to the thyristor rectifier portion the logical sum of the arc pulse equivalent to the number of groups output from the each of the pulse output portions of each of the group control units.

Furthermore, this aspect of the present invention provides a failure detector to each of the phase control portions and each of the automatic voltage regulator portions of each of the group control units, and provides a failure detector unit having for each group a group OR circuit that outputs the failure signal for a group and which is the logical sum of two detection signals from the failure detector portions in each group, so as to configure a control system so that failure signals for each group are supplied to the intermediate phase selector portion for all groups.

With the above configuration, the intermediate phase selector portions select the phase signals of the intermediate phase from the phase signals that are output from the triplicated phase control portions and automatic voltage regulator portions, and when any one of the triplicated phase control portions and automatic voltage regulator portions fails, either of the phase signals output from the other two systems is selected so as to select the phase signals output from the other system.

By this, normal phase signals are always selected even if one or two of the systems of the triplicated phase control portions and automatic voltage regulator portions fails.

As has been described above, according to the present invention, it is possible to select and output normal phase signals even if one or two of the systems of the triplicated phase control portions and automatic voltage regulator portions fails and to use this output as the basis for the supply of trigger pulses to a thyristor rectifier apparatus and therefore enable provide an excitation control system for synchronous machines and that has an extremely high reliability and that enables the continuous operation of the synchronous machines.

BRIEF DESCRIPTION OF THE DRAWINGS

In the appended drawings.

DETAILED DESCRIPTION OF THE PREFERRED EMBODIMENT

Figure 1:
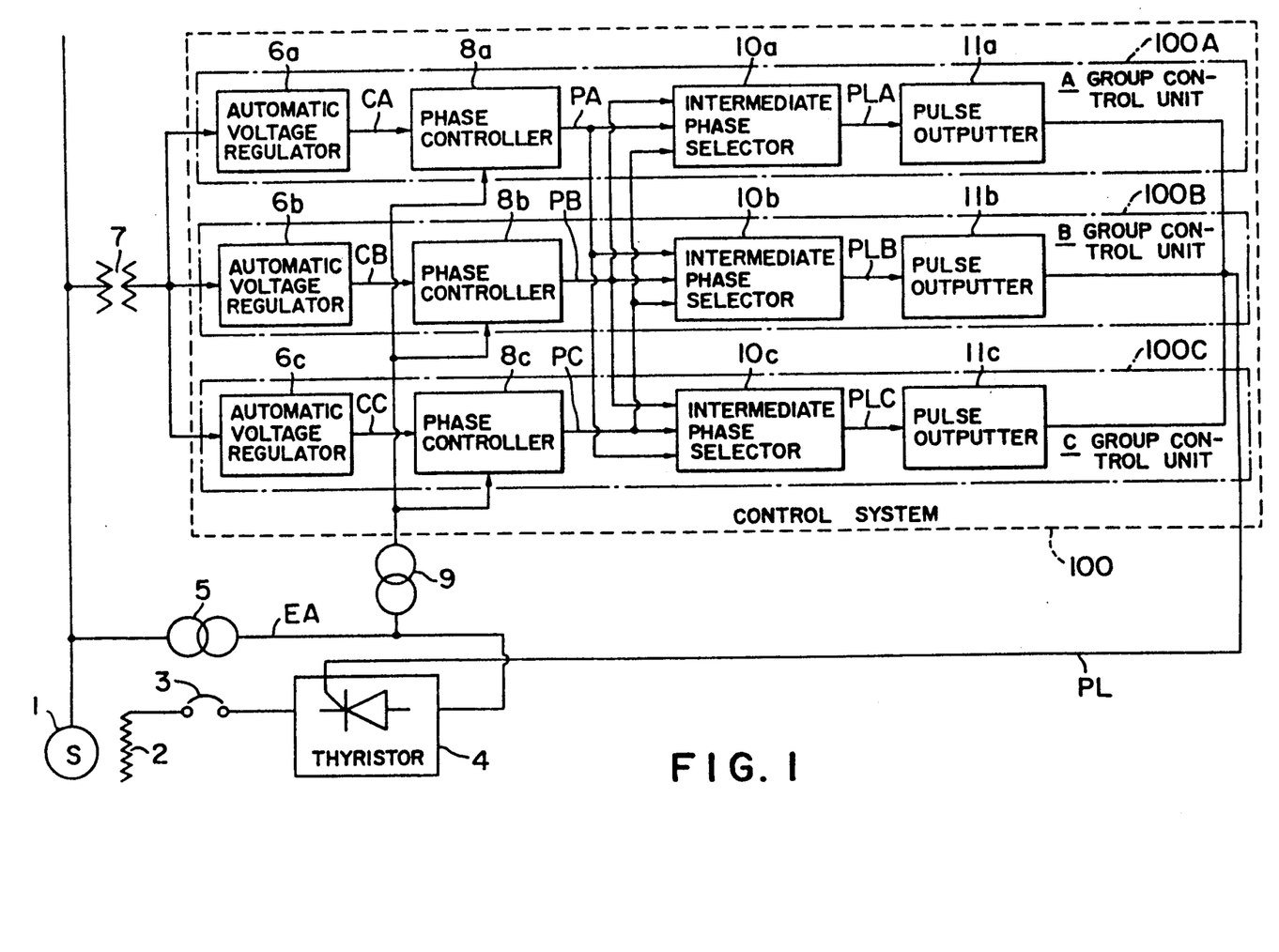
FIG. 1 is a view showing the configuration of an excitation control system according to a first embodiment of the present invention.

FIG. 1 is a view showing the configuration of an excitation control system for synchronous machines that have a duplicated configuration and according to a first embodiment of the present invention.

In the figure, a field winding 2 of a synchronous machine 1 is supplied via a field circuit breaker 3, with an excitation current from a thyristor rectifier apparatus 4 that has three-phase uniform bridge wiring, and the AC power EA from this thyristor rectifier apparatus 4 is supplied via an excitation transformer 5 from the output of the synchronous machine 1.

As shown in FIG. 1, a control system 100 comprises an A group control unit 100A, a B group control unit 100B and A C group control unit 100C, for respectively controlling an excitation of A-C groups.

Automatic voltage regulators 6a, 6b and 6c detect the terminal voltage of the synchronous machine 1 via the potential transformer 7 and perform control calculations so that this terminal voltage becomes equal to the objective value (set value), and outputs the control signals CA, CB and CC.

Phase controllers 8a, 8b and 8c input the AC power voltage EA via the transformer 9 and this AC power voltage is output as the reference phase as the phase signals PA, PB and PC that change in accordance with the control signals CA, CB and CC.

Intermediate pulse selectors 10a, 10b and 10c select the phase signals of the intermediate phase from the phase signals PA, PB and PC, and output the phase signals PLA, PLB and PLC.

Pulse outputters 11a, 11b and 11c output trigger pulses in the phase indicated by the phase signals PLA, PLB and PLC and the configuration is such that this output is connected by logical sum, and so that the firing pulses PL are supplied to the thyristor rectifier apparatus 4.

When there is normal operation, the automatic voltage regulators 6a, 6b and 6c and the phase controllers 8a, 8b and 8c operate in the same manner, respectively. However, the terminal voltage detection error of the automatic voltage regulators 6a, 6b and 6c, and the reference phase detection error of the phase controllers 8a, 8b and 8c cause there to be operation having a slight difference in the control signals CA, CB and CC, and the phase signals PA, PB and PC.

The intermediate phase selectors 10a, 10b and 10c select the phase signals of the intermediate phase from amongst the phase signals PA, PB and PC and so the phase signals PLA, PLB and PLC become the same signals.

Accordingly, the trigger pulses that are output by the pulse outputters 11a, 11b and 11c become the same signals and the trigger pulse PL which is the logical sum of them is also the same signal.

Figure 2:
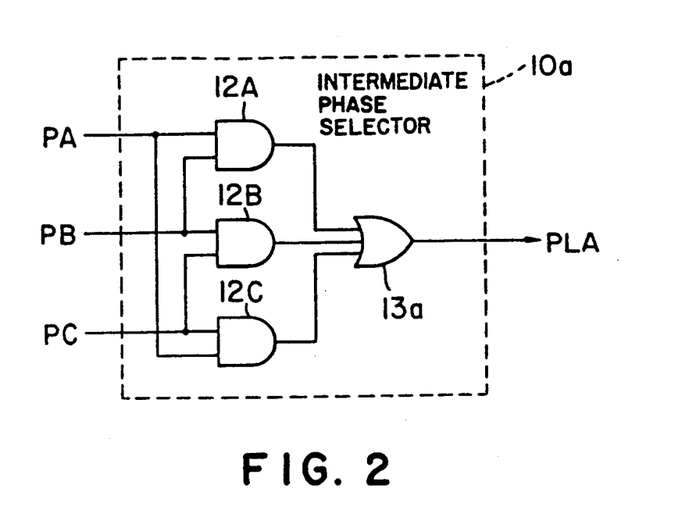
FIG. 2 is a view showing the configuration of an intermediate phase selector portion of the first embodiment of the present invention.

FIG. 2 is a view showing the configuration of the intermediate pulse selector 10a and is a majority circuit comprising an AND circuit (logical product) 12A, 12B and 12C and an OR circuit (logical sum) 13a and so the phase signals PLA become the majority result of the phase signals PA, PB and PC. Moreover, the other intermediate phase selectors 10b and 10c have the same configuration as the intermediate pulse selector 10a.

Figure 3:
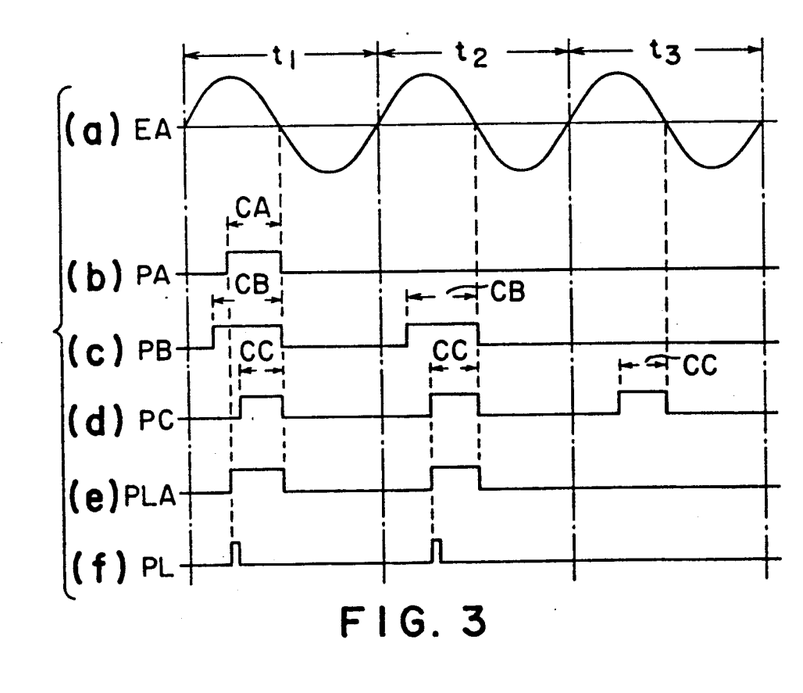
FIG. 3 is a waveform diagram showing the operation of an excitation control system of the first embodiment of the present invention.

FIG. 3 is a view showing the waveform indicating the operation of the excitation control system according to the first embodiment. The thyristor rectifier apparatus 4 has a three-phase uniform bridge wiring and so the firing pulses PL and the phase PA, PB, PC, PLA, PLB and PLC are each signals of the six phases but in FIG. 3, only one phase portion of there is indicated. In addition, the phase signals PLA, PLB and PLC become the same signal and so only the phase signal PLA is shown.

A cycle $t_1$ of the AC power EA shows the normal operation and the phase signals PA, PB and PC shown in FIG. 3(a) each become signals that are proportional to the control signals CA, CB and CC with each of the phases of the AC power EA being the reference, as shown in FIG. 3(b) through (d). As shown in FIG. 3(e), the phase signals PLA become the majority result of the phase signals PA, PB and PC and so for the cycle $t_1$, become the same signal as the phase signals PA. More specifically, the phase signal PLA selects the phase signal PA that indicates the intermediate phase of the three phase signals PA, PB and PC. The firing pulse PL becomes the pulse signal of a predetermined width from the rise of the phase signal PLA.

Then, the cycle $t_2$ shows the operation when either or both of the automatic voltage adjuster portion 6a or the phase control portion 8a fails and the phase signal PA is no longer output. In this case, the phase signal PLA is the result of the logical product of the phase signals PB and PC and so becomes the same signal as the phase signal PC.

Furthermore, the cycle $t_3$ shows the operation for the status where the phase signal PA is no longer output and either or both of the automatic voltage regulator 6b and the phase control portion 8b has failed and the phase signal PB is no longer output. In this case, the phase signal PLA is no longer output and so the firing pulse PL is also not output.

The following is a description of an exciter control system according to a second embodiment of the present invention with reference to FIGS. 4–7.

Figure 4:
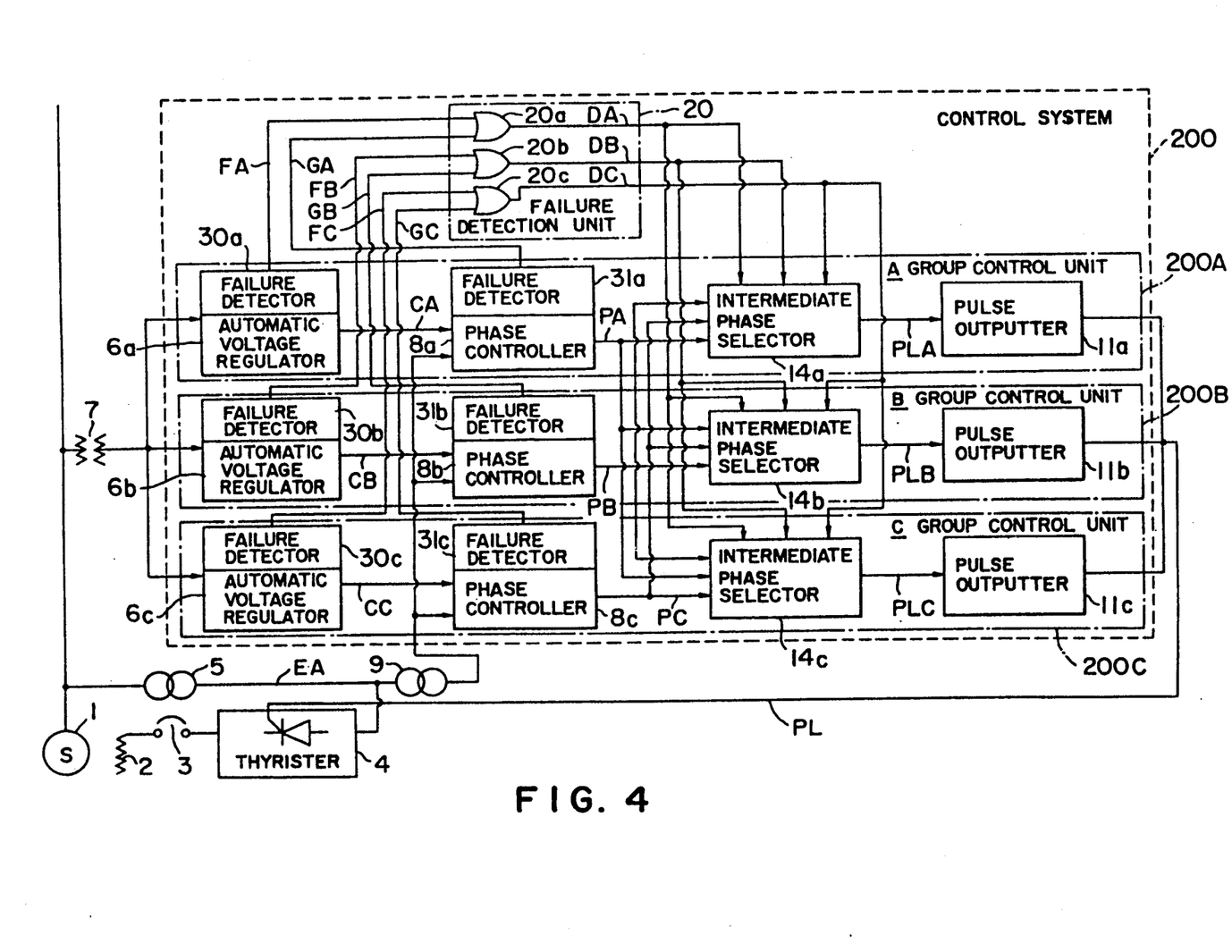
FIG. 4 is a view showing the configuration of an excitation control system according to a second embodiment of the present invention.

FIG. 4 is a view showing the configuration of the second embodiment of the excitation control system according to the present invention. In the figure, those portions that correspond to portions of FIG. 1 are indicated with corresponding numerals and the corresponding descriptions of them are omitted.

A control system 200 shown in FIG. 4 comprises an A group control unit 200A, a B group control unit 200B, a C group control unit 200C, and a failure detection unit 20 which detects each failure of A-C groups.

Intermediate phase selectors 14a, 14b and 14c input each of the phase signals PA, PB and PC, and the failure signals DA, DB and DC, and output the phase signals PLA, PLB and PLC.

The failure signal DA is turned on (hereinafter referred to as the "H" signal level) when there is a failure in either of the automatic voltage regulator 6a or the phase controller 8a of the A group, as detected by the OR circuit 20a of the failure detection unit 20. In the same manner as for the failure signal DA, the failure signals DB and DC become "H" when there is a failure in either or both of the automatic voltage regulators 6b and 6c and the phase controllers 8b and 8c, and are turned off (hereinafter referred to as the "L" signal level) when there is no failure, as detected by the OR circuits 20b and 20c provided to each group, respectively.

As shown in FIG. 4, in each A group control unit 200A, B group control unit 200B and C group control unit 200C, the automatic voltage regulator 6a, 6b or 6c comprises a failure detector 30a, 30b or 30c for outputting a detection signal FA, FB or FC, respectively, after detecting a failure of the regulator 6a, 6b or 6c. Moreover, the phase controller 8a, 8b or 8c also comprises a failure detector 31a, 31b or 31c for outputting a detection signal GA, GB or GC, respectively, when it detects a failure of the controller 8a, 8b or 8c.

The failure detection unit 20 comprises the OR circuit 20a for outputting the failure signal DA which is a logical sum of the detection signals FA and GA respectively output from the failure detectors 30a and 31a, the OR circuit 20b for outputting the failure signal DB which is a logical sum of the detection signals FB and GB respectively output from the failure detectors 30b and 31b, and the OR circuit 20c for outputting the failure signal DC which is a logical sum of the detection signals FC and GC respectively output from the failure detectors 30c and 31c. All these failure signals DA, DB and DC are supplied to all of the intermediate phase selectors 14a, 14b and 14c of A, B and C group control units.

Figure 5:
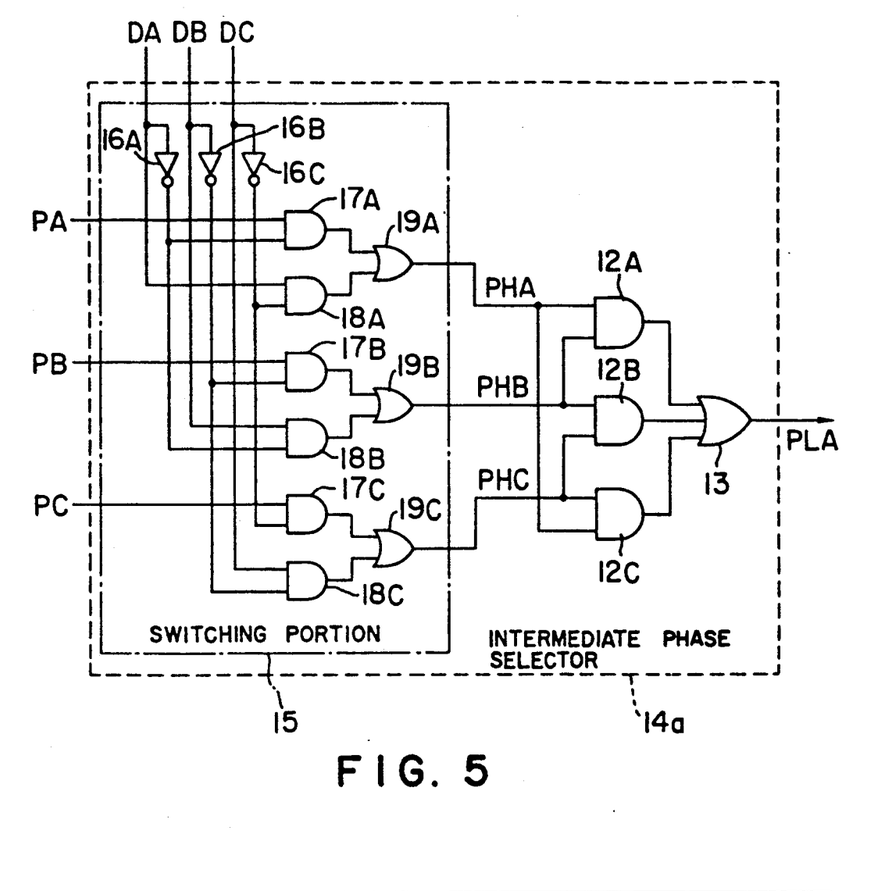
FIG. 5 is a view showing the configuration of an intermediate phase selector portion of the second embodiment of the excitation control system according to the present invention.

FIG. 5 is a view showing the configuration of an intermediate phase selector portion 14a, and in the figure, those portions that correspond to portions of FIG. 2 are indicated with corresponding numerals and the corresponding descriptions of them are omitted. A switching portion 15 outputs the phase signals PHA, PHB and PHC corresponding to the phase signals PA, PB and PC, and when the failure signals DA, DB and DC are all "L", the phase signals PHA, PHB and PHC are all the same value as the phase signals PA, PB and PC.

More specifically, this switching portion 15 is configured from inverters 16A, 16B and 16C that invert the failure signals DA, DB and DC, AND circuits 17A, 17B and 17C that determine the logical product of the inverted signals and the aforementioned failure signals DA, DB and AC, AND circuits 18A, 18B and 18C that respectively determine the logical product of the inverted signals of the signal DC with respect to the failure signal DA, the inverted signals of the signal DA with respect to the failure signal DB, and the inverted signals of the signal DB with respect to the failure signal DC, and OR circuits 19A, 19B and 19C that respectively determine the logical sum of the aforementioned AND circuits 17A and 18A, 17B and 18B, a-d 17C and 18C. Accordingly, when one of the failure signals DA, DB and DC is at the "H" level, one of the corresponding phase signals PHA, PHB and PHC becomes "H".

When two of the failure signals DA, DB and DC are at the "H" level, one of the corresponding phase signals PHA, PHB and PHC becomes the "H" level and the other becomes the "L" level.

When all of the failure signals DA, DB and DC are at the "H" level, the phase signals PHA, PHB and PHC all become the "L" level.

The phase signals PLA shows the majority result of the phase signals PHA, PHB and PHC.

Figure 6:
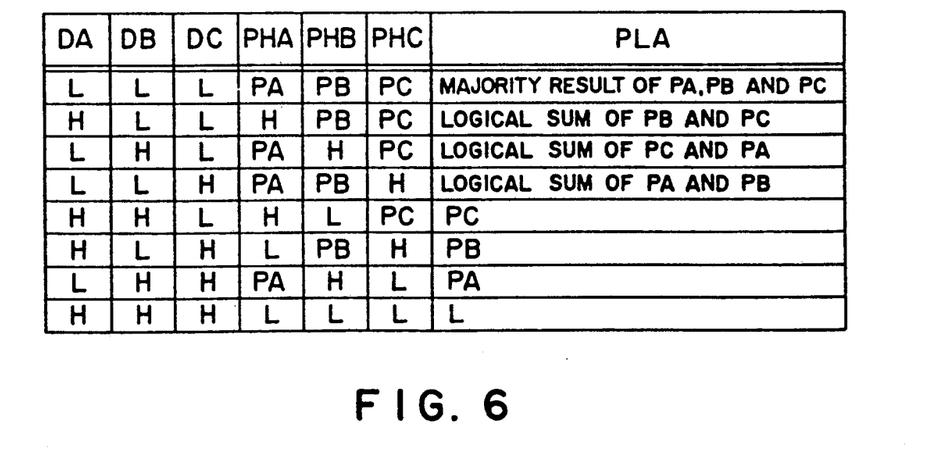
FIG. 6 is a view describing the truth value table of the intermediate phase selector portion of the second embodiment of the excitation control system according to the present invention.

FIG. 6 is a view describing the truth value table of the intermediate phase selector portion 14a with respect to the failure signals DA, DB and DC. As can be seen from the diagram, the phase signals PLA become the majority result of the phase signals PA, PB and PC when all of the failure signals DA, DB and DC are the "L" level. In addition, when either of the failure signals DA, DB and DC is at the "H" level, the logical sum of the two that of the phase signals PA, PB and PC that do not correspond to a failures is taken. Furthermore, when two of the failure signals DA, DB and DC are at the "H" level, the one of the phase signals PA, PB and PC that does not correspond to a failure becomes the phase signal PLA.

Figure 7:
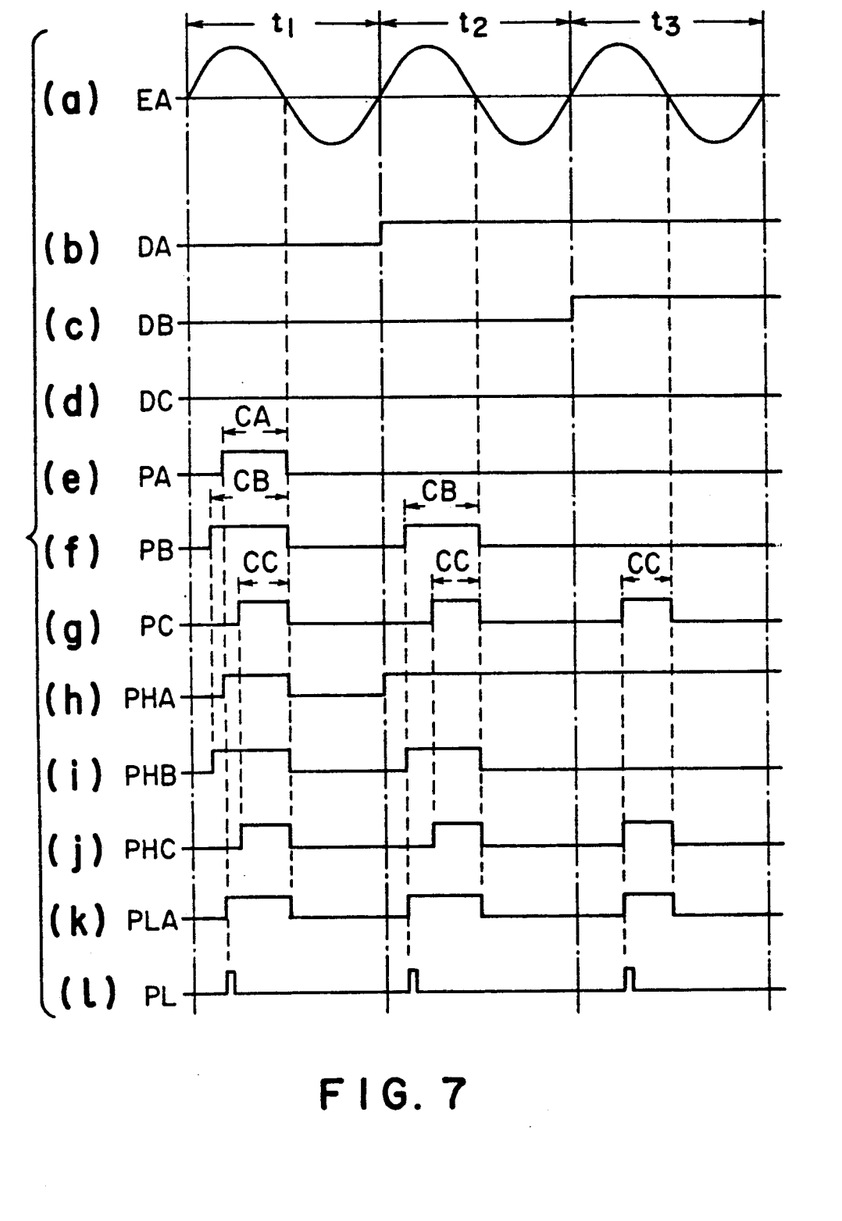
FIG. 7 is waveform diagram showing the operation of a control system relating to the second embodiment of the excitation control system according to the present invention.

FIG. 7 is a waveform diagram showing the operation of the control system 200 relating to the second embodiment of the present invention.

The cycle $t_1$ of the AC power shown in FIG. 7(a) shows normal operation, and the phase signals PA, PB and PC become signals that are proportional to the control signals CA, CB and CC, with the phases of the each of the AC power EA being the reference.

In FIG. 7(b) through (d), each of the failure signals DA, DB and DC show the "L" level and so the phase signals PHA, PHB and PHC becomes the same as each of the phase signals PA, PB and PC as shown in FIG. 7(e) through (g). Accordingly, the phase signals PLA become the same signals as the phase signals PA at the cycle $t_1$. The, trigger pulse PL becomes the pulse signal with a predetermined width from the rise of the phase signal PLA.

Then, the cycle $t_2$ shows the operation for the case when either or both of the automatic voltage regulator 6a and the phase controller 8a fails, and the phase signal PA is not output.

In this case, the failure signal DA becomes the "H" level as shown in FIG. 7(b) and so the phase signal PHA becomes "H" irrespective of the status of the phase signal PA and as shown in FIG. 7(h), and the phase signal PLA becomes the result of the logical sum of the phase signals PB and PC, as shown in FIG. 7(k). Accordingly, at the cycle $t_2$, the phase signals PLA become the same signal as the phase signal PB.

Furthermore, cycle $t_3$ shows the operation for the status where the phase signal PA is not output, and either or both of the automatic voltage regulator 6b and phase controller 8b fails, and the phase signal PB is no longer output.

In this case, as shown in FIG. 7(b) and (c), the failure signals DA and DB become the "H" level and so the phase signals PHA become the "H" level irrespective of the status of the phase signal PA, as shown in FIG. 7(h), and the phase signals PHB of FIG. 7(i) become the "L" level irrespective of the status of the phase signal PB, and at the cycle $t_3$, the phase signal PLA of FIG. 7(k) becomes the same signal as the phase signal PC of FIG. 7(g).

As has been described above, even if one or two systems of the triplicated automatic voltage regulators 6a, 6b and 6c and the triplicated phase controllers 8a, 8b and 8c fail, the intermediate phase selectors 14a, 14b and 14c select the phase signals of the normal system output of the phase signals PA, PB and PC and so the synchronous machine 1 can continue to operate normally.

What is claimed is:

1. An excitation control system for a synchronous machine, the control system comprising:
    a plural number of group control units that perform control of output pulses of a plural number of phase components, each of the group control units including an automatic voltage regulator portion that outputs a control signal to regulate the terminal voltage of a synchronous machine, a phase control portion that outputs a phase signal to control the phase of a trigger pulse of a thyristor rectifier apparatus that supplies a field current to a field winding of the synchronous machine, an intermediate phase selector portion that selects a phase signal of an intermediate phase from phase signals outputted by the phase control portions of the group control units, and a pulse output portion that outputs the trigger pulse on the basis of the intermediate phase signal selected by the intermediate phase selector portion; and
    a logical calculation circuit that supplies to the thyristor rectifier apparatus the logical sum of the trigger pulses from the group control units.

2. The control system of claim 1, wherein:
    a failure detector portion is provided for each phase control potion and each automatic voltage regulator portion of each of the group control units, and there is also provided a failure detector unit having for each of the group control units an OR circuit that outputs a failure signal for each of the group control units which is the logical sum of two detection signals from the failure detector portion(s) in each of the group control units, so as to configure the control system so that failure signals for each of the group control units are supplied to the intermediate phase selector portion for each of the group control units.

3. The control system of claim 2, wherein,
    the plural number of group control units is three and wherein,
    the intermediate phase selector portion of each of the three group control units selects the phase signal of an intermediate phase from three phase signals when no failure signals from the failure detector unit indicate a failure in any of the three group control units,
    the intermediate phase selector portion of each of the three group control units selects the phase signal of an intermediate phase from phase signals from two unfailed group control units when one of the three group control units fails because its automatic voltage regulator portion or phase control portion fails, and
    the intermediate phase selector portion of each of the three group control units selects the phase signal of an intermediate phase from phase signal output from an unfailed group control unit when two of the three group control units fail because their automatic voltage regulator portions or phase control portions fail.

4. The control system of claim 3, wherein:
    the intermediate phase selector portion of each of the three group control units receives the failure signals output from the failure detector unit, the failure detector unit detecting when the automatic voltage regulator portion or phase control portion of any of the three group control units has failed on the basis of the detection signals output from the failure detector portions in each of the three group control units.

5. The control system of claim 1, wherein:
    the plural number of group control units is three and wherein each group control unit further comprises,
    a first detector in the phase control portion, the first detector supplying a first detection signal,
    a second detector in the automatic voltage regulator portion, the second detector supplying a second detection signal,
        the control system further comprising,
            a failure detection unit, the failure detection unit including,
            a first OR circuit that takes a logical sum of the first detection signal and the second detection signal from a first of the three group control units and outputs a first failure signal to each intermediate phase selector portion of the three group control units,
            a second OR circuit that takes a logical sum of the first detection signal and the second detection signal from a second of the three group control units and outputs a second failure signal to each intermediate phase selector portion of the three group control units, and
            a third OR circuit that takes a logical sum of the first detection signal and the second detection signal from a third of the three group control units and outputs a third failure signal to each intermediate phase selector portion of the three group control units.

6. The control system of claim 1, wherein:
    the plural number of group control units is three, and wherein the intermediate phase selector portion of the three group control units includes,
    a switching portion that outputs the intermediate phase signal on the basis of the logical combination of failure signals and the phase signals, the failure signals indicating failure of any of the three group control units, and the phase signals outputted by the phase control portions of the three group control units, and a plural number of logical elements that by logical calculation of the phase signals, output the intermediate phase signal that is a majority result of the phase signals.

7. The control system of claim 6, wherein:

the failure signals include a first, second, and a third failure signal and the phase signals include first, second, and third phase signals and the switching portion includes first, second and third inverters that invert the first, second and third failure signals, first through third AND circuits that take the logical product of signals output from the first, second and third inverters and first, second and third phase signals, respectively, fourth through sixth AND circuits that take the logical product between a signal output form the third inverter and the first failure signal, between a signal output from the first inverter and the second failure signal, and between a signal output from the second inverter and the third failure signal, respectively, and first through third OR circuits that respectively take the logical sum of outputs of the first and fourth AND circuits, second and fifth AND circuits and third and sixth AND circuits and respectively output the phase signals.

8. The control system of claim 6, wherein:

the phase signals include first, second and third phase signals and the logical elements include first through third AND circuits that respectively take the logical sum of first and second phase signals, second and third phase signals, and third and first phase signals, and an OR circuit that inputs all of the outputs of the first through third AND circuits, takes the logical sum, and outputs the intermediate phase signal that indicates a majority result of the phase signals.

the logical elements include first through third AND circuits that respectively take the logical sum of first and second phase signals, second and third phase signals, and third and first phase signals, and an OR circuit that inputs all of the outputs of the first through third AND circuits, takes the logical sum, and outputs the intermediate phase signal that indicates a majority result of the phase signals.

* * * * *